(12) United States Patent
Negro et al.

(10) Patent No.: US 8,873,892 B2
(45) Date of Patent: Oct. 28, 2014

(54) TRAINABLE HANDHELD OPTICAL CHARACTER RECOGNITION SYSTEMS AND METHODS

(75) Inventors: James A. Negro, Arlington, MA (US); Carl W. Gerst, III, Clifton Park, NY (US)

(73) Assignee: Cognex Corporation, Natick, MA (US)

( * ) Notice: Subject to any disclaimer, the term of this patent is extended or adjusted under 35 U.S.C. 154(b) by 246 days.

(21) Appl. No.: 13/590,744

(22) Filed: Aug. 21, 2012

(65) Prior Publication Data
US 2014/0056542 A1 Feb. 27, 2014

(51) Int. Cl.
*G06K 9/22* (2006.01)

(52) U.S. Cl.
USPC ........... 382/313; 382/312; 382/321; 358/505; 358/473; 358/474

(58) Field of Classification Search
USPC .................................. 382/312, 317, 313, 321
See application file for complete search history.

(56) References Cited

U.S. PATENT DOCUMENTS

| | | | |
|---|---|---|---|
| 4,210,802 A | 7/1980 | Sakai | |
| 4,222,654 A | 9/1980 | Bodenhamer | |
| 4,288,690 A | 9/1981 | Sanner | |
| 5,191,199 A | 3/1993 | Elko | |
| 5,285,056 A | 2/1994 | Tedesco et al. | |
| 5,486,944 A | 1/1996 | Bard et al. | |
| 5,569,902 A | 10/1996 | Wood et al. | |
| 5,656,803 A | 8/1997 | Seo | |
| 5,675,149 A * | 10/1997 | Wood et al. | 250/332 |
| 5,786,586 A | 7/1998 | Pidhirny et al. | |
| 6,000,612 A | 12/1999 | Xu | |
| 6,045,047 A | 4/2000 | Pidhirny et al. | |
| 6,246,925 B1 | 6/2001 | Robinson et al. | |
| 7,180,607 B2 * | 2/2007 | Kyle et al. | 356/614 |
| 7,194,200 B1 | 3/2007 | Behlow | |
| 7,233,990 B1 * | 6/2007 | Debaty et al. | 709/224 |
| 7,570,816 B2 | 8/2009 | Bargeron et al. | |
| 7,600,687 B2 | 10/2009 | Biss et al. | |
| 7,897,923 B2 * | 3/2011 | Shelley et al. | 250/339.11 |
| 8,014,604 B2 | 9/2011 | Tzadok et al. | |
| 8,027,802 B1 | 9/2011 | Nadabar et al. | |
| 8,069,289 B2 | 11/2011 | Hafer et al. | |
| 8,081,849 B2 | 12/2011 | King et al. | |
| 8,251,279 B2 | 8/2012 | Lyon et al. | |
| 8,279,430 B2 * | 10/2012 | Dold et al. | 356/139.04 |
| 2008/0260210 A1 | 10/2008 | Kobeli et al. | |
| 2011/0128373 A1 | 6/2011 | Goldberg | |
| 2012/0281087 A1 | 11/2012 | Kruse | |

OTHER PUBLICATIONS

Brennan, Elaine and Allean Renear. "New Communication Media; Scanning." Humanist Discussion Group, vol. 3, No. 1337. May 1, 1990.

* cited by examiner

*Primary Examiner* — Yosef Kassa
(74) *Attorney, Agent, or Firm* — Quarles & Brady LLP (57) ABSTRACT

A handheld scanner incorporates vision software to allow the handheld scanner to be trained for OCR. The handheld scanner can include a user interface to allow a user to associate an image of a mark with electronic data for the mark. The user interface, along with a range finder, can also be used to influence variables that affect the quality of an image scan, thereby improving the quality of results for the image scan and/or decode process.

21 Claims, 5 Drawing Sheets

TRAINABLE HANDHELD OPTICAL CHARACTER RECOGNITION SYSTEMS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE TECHNOLOGY

The present technology relates to imaging systems, and more specifically, to a handheld scanner with trainable optical character recognition functionality.

Optical imaging systems that incorporate optical character recognition (OCR) are used for reading fonts and other symbols on packages or articles, for example. One of the most common of these imaging systems is the handheld scanner. OCR is generally considered as an electronic conversion of scanned images of handwritten, typewritten or printed text into machine-encoded text. It is important for imaging systems to achieve a quality scan so the image can be electronically searched, stored more compactly, displayed on-line, and used in machine processes such as machine translation, text-to-speech and text mining applications.

In order to improve scanning results, some optical imaging systems utilize standardized machine readable fonts, such as OCR-A and OCR-B, that were created to make the OCR process more accurate. The standardized font made decoding the font in an image far less complicated because the imaging system was made aware of the simplified fonts it was attempting to scan, and the individual characters in the fonts were designed to be easily distinguishable. For example the numeral "zero" contains a slash in order to help discriminate it from the alphabetical "o" (lower case) and "O" (uppercase). Nevertheless, many imaging applications, especially those where a handheld scanner is desired to scan an object or article, do not use standardized fonts.

Some modern OCR systems can be "trained" to recognize alternate fonts and other symbols. Yet, the training process is a complicated and time consuming process where each font and/or symbol must be scanned and then manually associated with the desired electronic character or data. The training process involves use of a computer where a user can view scanned images and match the image to the desired data. Once all the fonts or symbols are associated with the desired data, an electronic file with all the association data can be generated and can then be transferred to the imaging system for use by the imaging system to improve the results of a scan.

There are current handheld scanners that have limited OCR functionality, yet, these current handheld scanners require pre-configured machine readable fonts, such as OCR-A and OCR-B. Training current handheld scanners on alternate fonts or symbols is not an option because the handheld scanners do not have the processing power and user interface to provide the association between fonts and symbols and the desired data. In addition, as with any imaging device, providing quality results for each image scan can be difficult taking into consideration the numerous variables that affect the quality of an image scan.

What is needed are systems and methods that allow a handheld scanner to be trained on alternate fonts and/or symbols. What is also needed are systems and methods that can improve the quality of results for each image scan by influencing the variables that affect the quality of an image scan.

BRIEF SUMMARY OF THE TECHNOLOGY

The present embodiments overcomes the disadvantages of the prior art by incorporating vision software with a handheld scanner to allow the handheld scanner to be trained for OCR. The handheld scanner can include a user interface to allow a user to associate an image of a mark with electronic data for the mark. The user interface, along with a range finder, can also be used to influence variables that affect the quality of an image scan, thereby improving the quality of results for an image scan and/or decode process.

Accordingly, some embodiments comprise an OCR trainable handheld scanner. The OCR trainable handheld scanner includes a scanner subassembly. The scanner subassembly includes a vision sensor, a processor coupled to the vision sensor, and memory coupled to the processor. A user interface is coupled to the scanner subassembly, with the user interface including a visual display for viewing a live image of at least a portion of a mark to be scanned. The visual display includes a region of interest viewable on the visual display, the region of interest to enable a user to position the handheld scanner for optimal X-Y position of the handheld scanner. A range finder is also coupled to the scanner subassembly, the range finder extending from a face of the scanner subassembly a predetermined distance. The predetermined distance provides an optimal working distance for a scan, with the range finder extending off of the face of the scanner subassembly substantially parallel to an optical axis of the vision sensor. The range finder can comprise a diffusive material. Vision software executable by the processor is included, the vision software operable to associate an electronic image of the mark with desired electronic data and to generate a font description file, the font description file being usable to decode a subsequent image of the mark.

Other embodiments comprise a handheld scanner. The handheld scanner includes a handheld scanner subassembly. The scanner subassembly includes a vision sensor, a processor coupled to the vision sensor, and memory coupled to the processor. The handheld scanner subassembly is operable to generate an electronic image of a mark and store the electronic image of the mark in the memory. A user interface is coupled to the handheld scanner subassembly, with the user interface including a visual display for viewing a live image of at least a portion of the mark to be scanned. The visual display includes a region of interest viewable on the visual display, with the region of interest enabling a user to position the handheld scanner for optimal X-Y position of the handheld scanner for a scan of the mark.

In some embodiments, a computer can be coupled to the handheld scanner subassembly, with the computer including vision software operable to download the electronic image of the mark, associate the electronic image of the mark with desired electronic data, and to generate a font description file of the associated mark. The computer is operable to upload the font description file to the handheld scanner subassembly, the font description file usable by the processor to decode a subsequent image of the mark.

Yet other embodiments comprise a handheld scanner. The handheld scanner includes a handheld scanner subassembly. The scanner subassembly includes a vision sensor, a processor coupled to the vision sensor, and memory coupled to the processor. The handheld scanner subassembly is operable to generate an electronic image of a mark and store the electronic image of the mark in the memory. A range finder is coupled to the handheld scanner subassembly. The range finder extends from a face of the scanner subassembly a predetermined distance. The predetermined distance is to provide an optimal working distance for a scan, with the range finder extending from the face of the scanner subassembly substantially parallel to an optical axis of the vision sensor.

Consistent with the above, some embodiments include a method for scanning a mark on an object. The method includes providing a handheld scanner, the handheld scanner including a user interface and a range finder; enabling a visual display on the user interface, the visual display for viewing a live image of at least a portion of the mark; observing the visual display while moving the handheld scanner so the visual display displays the live image of the at least a portion of the mark; positioning the live image of the at least a portion of the mark near to or within a region of interest viewable on the visual display for alignment feedback; positioning the handheld scanner so a distal end of the range finder touches or is substantially near the object; and enabling a scan of the mark.

Other embodiments include a method of training a handheld scanner for OCR of a mark. The method includes providing a handheld scanner, the handheld scanner including memory and a user interface; enabling a visual display on the user interface, the visual display for viewing a live image of the mark; observing the visual display while moving the handheld scanner so the visual display displays the live image of the mark; enabling a scan of the mark to generate an electronic image of the mark; storing the electronic image of the mark in the memory; associating the electronic image of the mark with the desired electronic data; generating a font description file that associates the electronic image with the desired electronic data; and storing the font description file in the memory.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory medium" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory medium" may also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates both an electronic device configuration and systems and methods for assembling an electronic device using a carrier frame to support PCBs.

The various embodiments of an imaging system will be described in connection with a handheld scanner adapted to be trained to perform OCR on alternate fonts and other symbols. That is because the features and advantages of the technology are well suited for this purpose. Still, it should be appreciated that the various aspects of the technology can be applied in other forms of imaging systems that may benefit from OCR functionality.

Figures 1, 2:
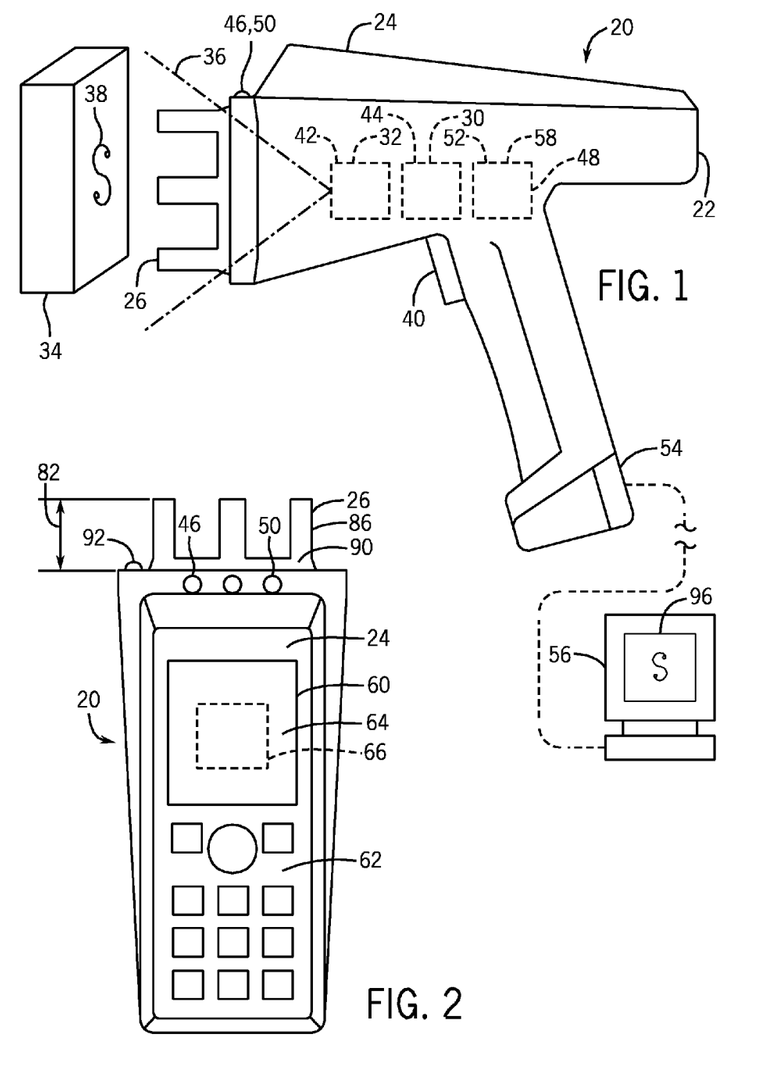
FIG. 1 is a schematic view of one embodiment of a handheld scanner in accordance with the present embodiments, and showing an optional computer usable for OCR functionality.
FIG. 2 is a top view of the handheld scanner as seen in FIG. 1.

Referring now to FIG. 1, one exemplary embodiment will be described in the context of a handheld scanner 20 that includes, among other components, a scanner subassembly 22, a user interface 24, and an optional range finder 26. The exemplary handheld scanner 20 can be used in a warehousing, manufacturing, assembly, automation, and/or control application, among others, as non-limiting examples. The exemplary handheld scanner 20 can use image acquisition software 30 operable to perform any of various types of image acquisitions. The handheld scanner 20 can perform machine vision tasks including scanning and decoding images containing fonts and/or symbols, as non-limiting examples.

Referring still to FIG. 1, the scanner subassembly 22 can include a variety of components that are used in the scanning process. For example, scanner subassembly 22 can include a vision sensor 32. The vision sensor 32 serves to convert reflected light from an object 34 and associated mark 38 (shown as a stylized S) on the object into electrons to create an electronic image 48 of the mark 38 in the field of view (FOV) 36 when a trigger 40 is pulled or released. In some embodiments, a lens assembly 42 can be positioned over or in front of the vision sensor 32 to provide a view of the object 34 in the FOV 36 to the vision sensor 32.

Scanner subassembly 22 can also include a processor 44 used for image processing and decoding, for example. The processor 44 is coupled to the vision sensor 32, and can either be part of the vision sensor 32, or it can be locally linked to the vision sensor 32. The processor 44 can be encoded with the image acquisition software 30 that can be configured to, among other things, control illumination, acquire image data, and process/decode the acquired image data into usable information. Processor 44 can also be coupled to one or more visual feedback devices 46 and/or one or more audio feedback devices 50 to provide feedback to a user indicating the results of the scan and/or decode process (e.g., whether or not the quality of the imaged mark meets or exceeds a baseline quality assessment value). For example, visual feedback devices 46 may include lights or light emitting diodes 46 and the audio feedback device 50 may include a small speaker or beeper device 50. In at least some cases, different LED colors may be used to indicate whether or not the mark quality passes the baseline value test (e.g., a green LED may indicate high mark quality while a red LED indicates a mark that failed a quality test).

Scanner subassembly 22 can also include a memory medium 52 coupled to the vision sensor 32 and/or the processor 44. The memory medium can be used for storing scanned or processed images 48, font description files 58, and buffering data and communications, and the like. A communication port 54 can also be coupled to the processor 44, and provide a connection point to an optional computer 56. The computer 56 can be used for uploading and downloading scanned or processed images 48, and font description files 58, for example. It is to be appreciated that wireless communications are also contemplated.

Referring to FIG. 1, and also FIG. 2, the handheld scanner 20 can also include a user interface 24 to allow a user to affect the quality of the results from a scan. In some embodiments, the user interface can comprise a small portable data terminal or similar device running the Microsoft Windows CE platform, for example.

The user interface 24 can include a display screen 60 and a keyboard 62, and can be integral with the scanner subassembly 22, or can be a removable device that can operatively couple to the scanner subassembly 22. In some embodiments, the display screen 60 can include touch screen functionality, eliminating or reducing the number of keys that may be included with the keyboard 62. The display screen 60 provides a live feedback view 64 of what is in at least a portion of the FOV 36 of the handheld scanner 20.

The exemplary display screen 60 can include a region of interest (ROI) area 66 outlined or otherwise visible to the user on the display screen 60. The live feedback view 64 and ROI 66 allows the user to manually affect at least one imaging variable to improve the quality of the results from a scan by allowing the user to generally see a live image of what the vision sensor 32 is seeing in the FOV 36, and to reposition the handheld scanner 20 so the desired mark 38 is optimally positioned within the ROI 66 for a scan. The live feedback view 64 can be enabled when the trigger 40 is pulled, or optionally, the live feedback view 64 can be enabled when the handheld scanner 20 is powered on and ready to scan, for example.

Figure 3:
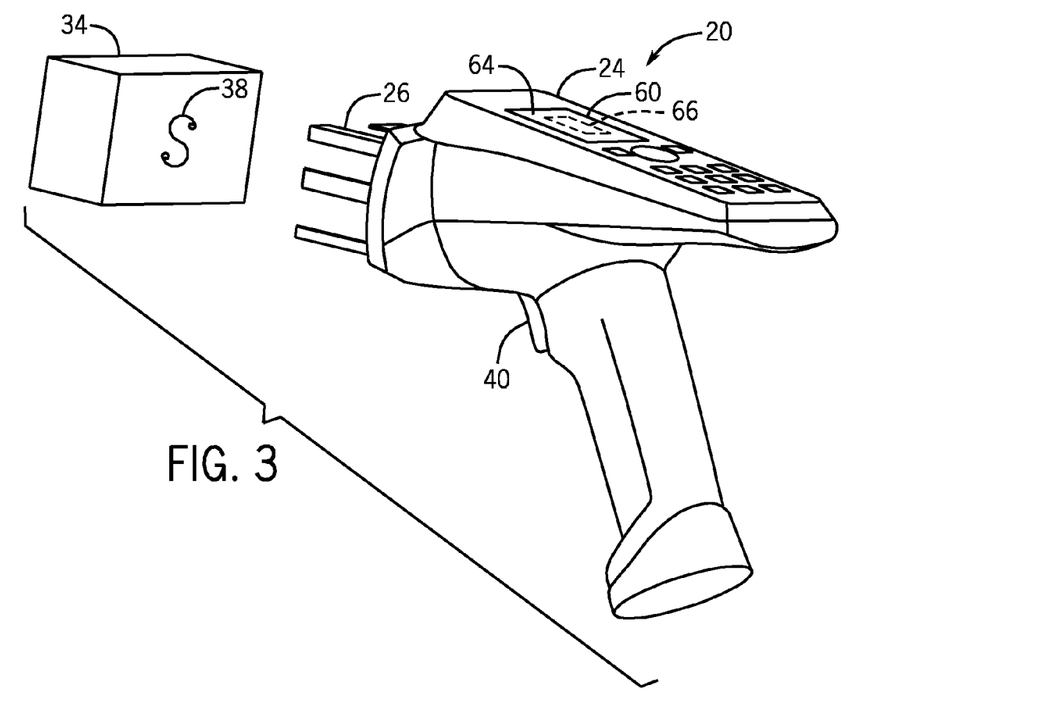
FIG. 3 is a perspective view of the handheld scanner as seen in FIG. 1, and showing the handheld scanner in a position prior to scanning an object.

Referring to FIG. 3, a user would position the handheld scanner 20 a certain distance away from the object 34 and associated mark 38 to be scanned. In some embodiments, the user would then engage the trigger 40 to allow the display screen 60 to display the live feedback view 64. The ROI 66 can generally be permanent on the display screen 60, such as with an overlay, or the ROI 66 can be an adjustable image where the height and width can be adjusted for specific applications, and displayed on the display screen 60 along with the live feedback view 64. It is to be appreciated that the ROI 66 need not be a square, as shown, but can be any indication on the display screen 60 that would allow a user to reposition the handheld scanner 20 to improve the quality of the results from a scan. For example, a circle, an "X", a dot, or arrows, or any combination, can be used.

Figure 4:
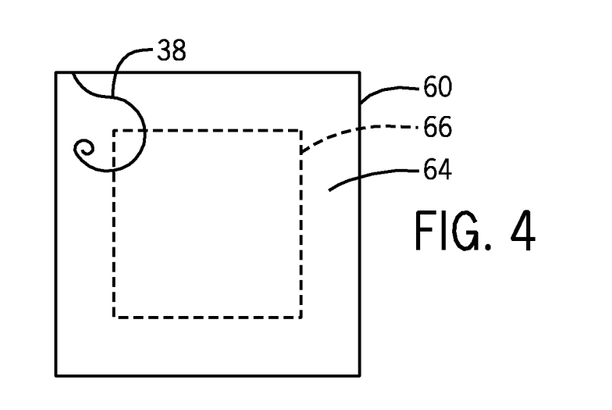
FIG. 4 is a view of a display screen from a handheld scanner in accordance with the present embodiments, and showing a mark on an object in partial view and only a portion of the mark being within a region of interest.
Figure 5:
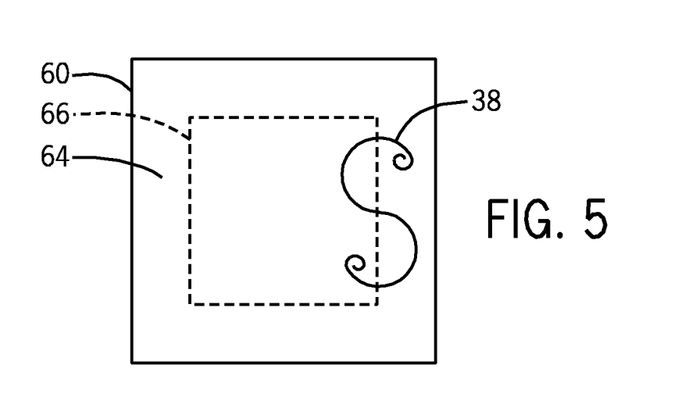
FIG. 5 is a view of the display screen as seen in FIG. 4, and now showing the mark in full view yet with still only a portion of the mark being within the region of interest.
Figure 6:
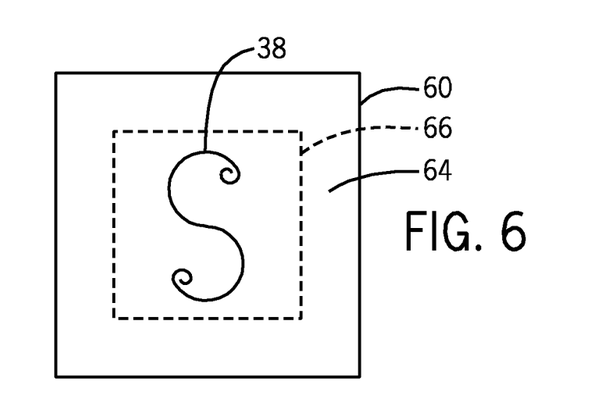
FIG. 6 is a view of the display screen as seen in FIG. 5, and now showing the mark in full view and with the mark being within the region of interest.

Referring to FIG. 4, an exemplary view of a display screen 60 is shown where the mark 38 is partially within the FOV 36 of vision sensor 32 and is therefore partially displayed on the display screen 60. The user, in seeing the mark 38 only partially displayed, can then adjust the position of the handheld scanner 20 in an attempt to reposition the handheld scanner 20 (or reposition the mark 38) so the mark 38 is within the ROI 66. FIG. 5 shows an example where the mark 38 is within the FOV 36 and is partially with the ROI 66. In some embodiments, the mark 38 could be scanned at this point. To improve the quality of the results from the scan, the user could further reposition the handheld scanner 20 (or reposition the mark 38) so the mark 38 is substantially or completely within the ROI 66. FIG. 6 shows a view of the display screen 60 where the mark 38 is completely within the ROI 66.

In some embodiments, the visual feedback device 46 and/or the audio feedback device 50 can be used to provide feedback to a user indicating a position of the mark 38, e.g., the mark is partially or completely within the ROI.

Figure 7:
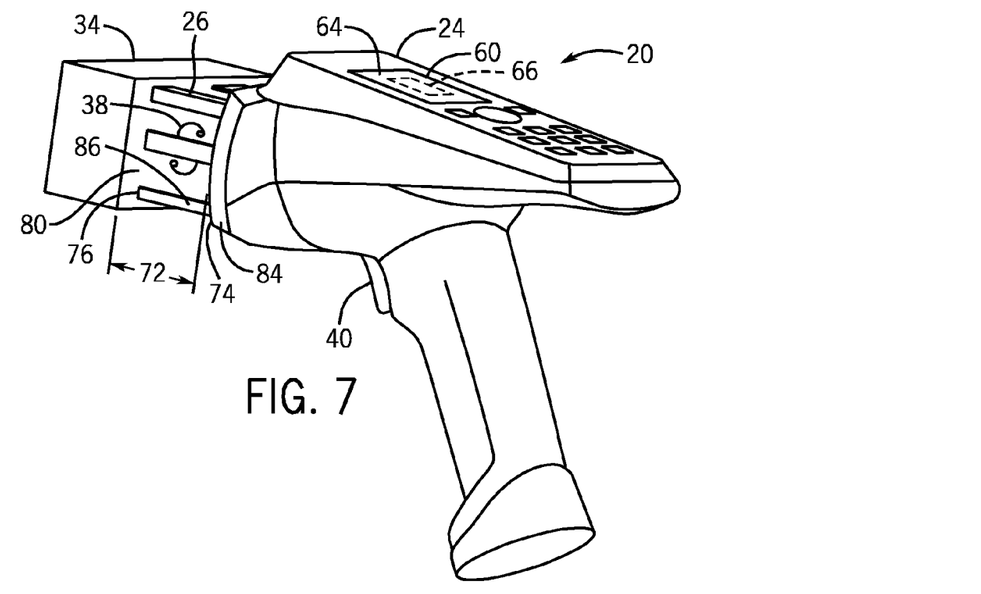
FIG. 7 is a perspective view of the handheld scanner as seen in FIG. 3, now being in a scanning position with a predetermined distance from the object to the handheld scanner.

Referring now to FIG. 7, an embodiment of the handheld scanner 20 can include a range finder 26. The range finder 26 can also serve to improve the quality of the results from the scan, alone, or in combination with the display screen 60 and associated ROI 66. When using a traditional handheld scanner, uncertainty is inherently introduced in a mark scan by the physical position of the object 34 and associated mark 38 in relation to the handheld scanner. The display screen 60 and associated ROI 66 improve the X-Y position of one or both of the handheld scanner 20 and the mark 38, and offer some improvement in the Z position or working distance, while the use of the range finder 26 can position the handheld scanner 20 for optimal working distance and scale, while also aiding in the X-Y position.

In embodiments with the range finder 26, results of a scan can be improved provided the handheld scanner 20 is a predetermined optimal distance 72 from the object 34 and associated mark 38 to be scanned so that the image is generally in focus without requiring the processor 44 to perform extensive calculations in an attempt to improve the focus of the mark 38. The optimal working distance is important to determine the scale of the mark in the image and to insure a sufficient focus. In other embodiments, lens assembly 42 can be a constant focus or "zoom" lens assembly 42 that can be used to provide constant magnification for a wide range of working distances.

In the embodiment shown, the range finder 26 includes a plurality of fingers 86 extending from a base 90 (see FIG. 2). In this configuration, the mark 38 can remain visible to a user that may be looking at the mark 38 on the object 34. In other embodiments, the range finder 26 may be more tubular or rectangular in shape without any gaps as provided by the fingers 86, thereby partially or substantially reducing the user's ability to visualize the actual mark 38 on the object 34.

As shown in FIG. 7, the range finder 26 can extend from a front end face 74 of the handheld scanner 20. The range finder 26 can be a rigid member that extends along a trajectory that is substantially parallel to a central trajectory (not shown) of the FOV 36. In operation, a user can position the handheld scanner 20 so that a distal end 76 of the range finder 26 contacts a first surface 80 of the object 34 adjacent to the mark 38 to be read prior to activating the handheld scanner 20. Here, the length 82 of the range finder 26 (see FIG. 2) is designed so that the optimal imaging distance 72 occurs between the handheld scanner 20 and first surface 80 when distal end 76 contacts the first surface 80. Thus, range finder 26 also can help to eliminate or reduce at least one imaging variable in at least some embodiments.

Referring still to FIG. 7, while the range finder 26 is shown as rigid and integrally formed with the handheld scanner 20, in some embodiments, the range finder 26 can be flexible, can be telescoping like a radio antenna, and can fold into a storage position, for example. In some embodiments, the range finder 26 can be removable. For instance, range finder 26 can attach at the front face 74 using a clip or collar 84 or the like that couples to the front face 74 of the handheld scanner 20. The range finder 26 can also be made of a diffusive material, thereby taking advantage of lighting options available with the handheld scanner 20. The illumination from the handheld scanner 20 can then pass through the diffusive material and provide additional diffuse illumination benefits to improve the quality of the results from a scan.

In some embodiments, a measurement device 92, such as a known LED or laser diode 92 for distance measurements, can be included in combination with the range finder 26 or in place of the range finder (see FIG. 2). The laser diode 92 can operate in unison with the display screen 60 to provide an indication when an optimal working distance is reached. The measurement device 92 can function as a range finder, such as a time of flight laser range finder. The measurement device 92 can be used to determine the distance to the mark 38 used for training and the distance to the mark 38 used for scanning. Scale differences between training and scanning configurations could then be known and the magnification can be compensated by standard machine vision techniques, such as resizing the image, or compensating for scale in an OCR algorithm.

Referring back to FIG. 1, the handheld scanner 20 can be trained to perform OCR on custom and/or alternate fonts and other symbols. In this way, a user is able to control what fonts and symbols the handheld scanner 20 is able to accurately scan and decode.

A problem with current handheld scanners is that they are limited to scanning standardized machine readable fonts such as known character sets OCR-A and OCR-B, and are not able to be trained to the user's requirements. These characters were designed to be easily read and recognized. The current handheld scanners are not able to read custom characters, and that can be printed using different printing methods, such as dot matrix, and they are not able to read custom characters that are printed on consumer items, such as a bag of potato chips. These scanning applications frequently involve non-typical reading conditions, including varying light, varying depth of field, various printing methods, and varying angular reads. These conditions present problems that are not resolved in current OCR capable handheld scanners. The incorporation of the display screen 60 and the range finder 26 with the trained handheld scanner 20 to recognize alternate fonts and symbols addresses these non-typical reading conditions.

To train the handheld scanner 20, in one embodiment, a computer 56 may be used to create a font description file 58 that associates an image with a font. The handheld scanner 20 can be used to acquire an electronic image 48 of a character, e.g., mark 38. The image 48 can be downloaded to the computer 56 where vision software 96, such as In-Sight® Explorer software from Cognex Corporation, can be used to associate the image with a font. Once the font description file 58 is created, the font description file 58 can be uploaded to memory 52 in the handheld scanner 20. The handheld scanner 20 can then be configured to read the font description file 58, which allows the handheld scanner 20 to scan and decode the font.

In an alternative embodiment, the computer 54 can be eliminated and the association process and font description file 58 generation can take place on the handheld scanner 20. The user interface 24 can include the vision software 96 and the keyboard 62 can include sufficient functionality to complete the association process.

Figure 8:
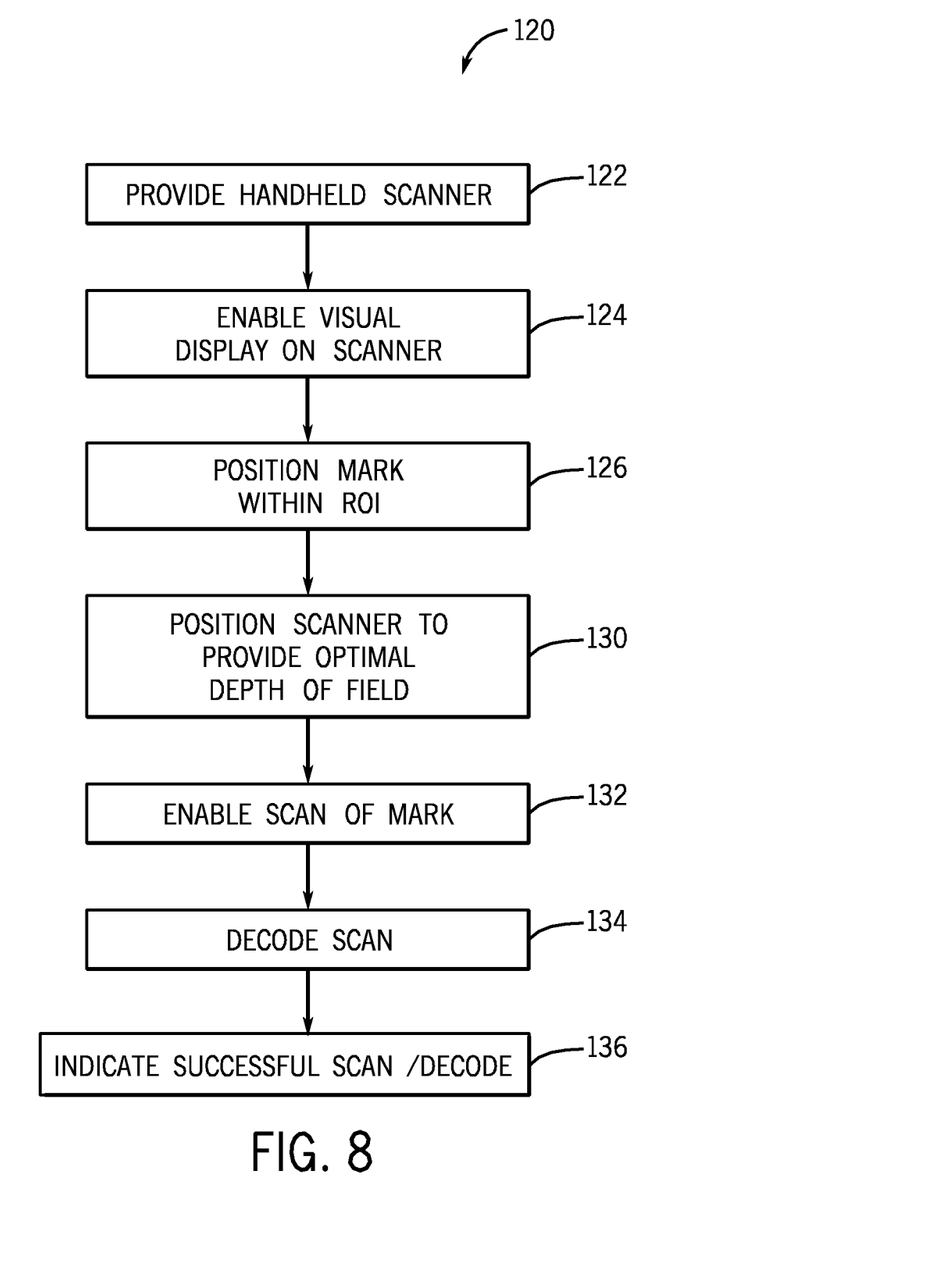
FIGS. 8 and 9 are flow charts of methods associated with the handheld scanner.
Figure 9:
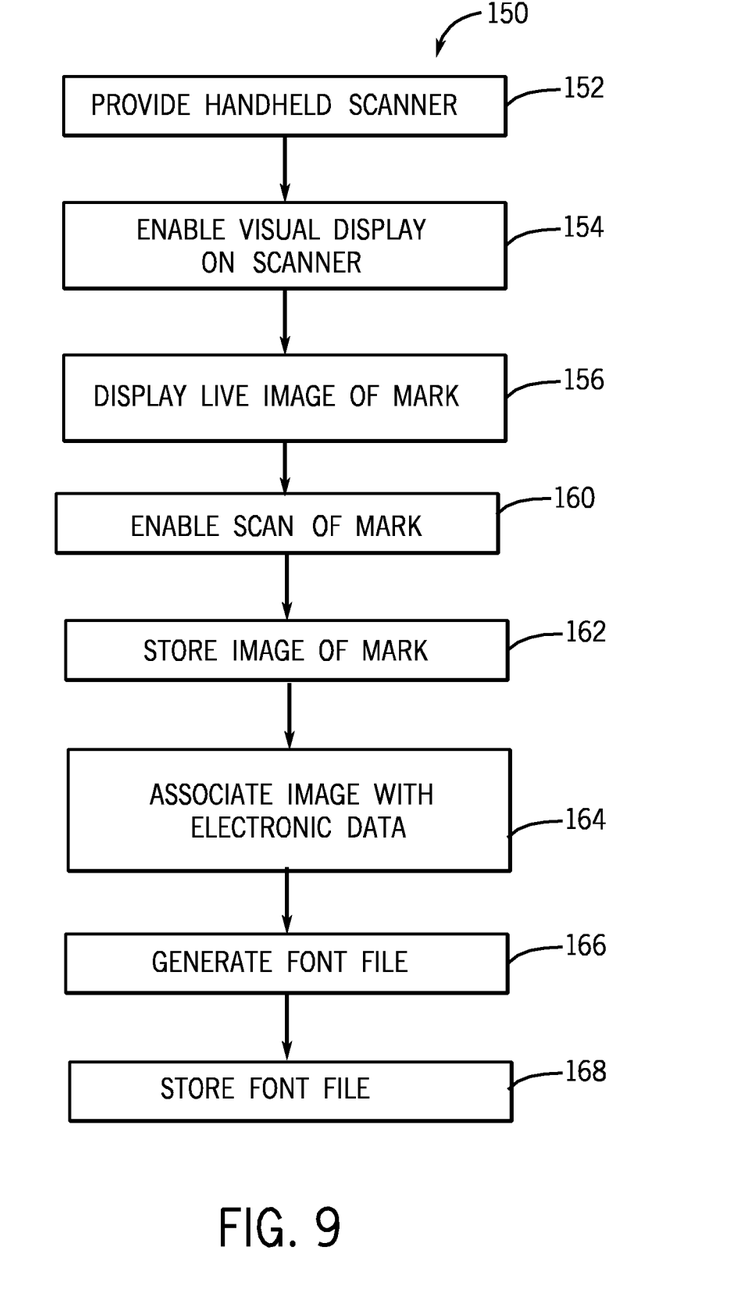

FIGS. 8 and 9 illustrate embodiments of methods for use of a handheld scanner 20. The methods shown in FIGS. 8 and 9 may be used in conjunction with any of the systems or devices shown in the above Figures, among others. In various embodiments, some of the method elements shown may be performed concurrently, in a different order than shown, or may be omitted. Additional method elements may also be performed as desired.

Referring to FIG. 8, a method 120 is shown for scanning a mark 38 on an object 34. A first step can be to provide a handheld scanner 20 including a user interface 24 and a range finder 26, as indicated at process block 122. At process block 124, a user can squeeze the trigger 40 to enable the visual display 60. At process block 126, the user can then observe the visual display 60 while moving the handheld scanner 20 so as to position the mark 38 as reasonably possible near to or within the ROI 66. The user can then position the handheld scanner 20, at process block 130, such that the distal end 76 of the range finder 20 touches or is substantially near the first surface 80 of the object 34 and the mark 38 to provide the optimal working distance for the scan. It is to be appreciated that the handheld scanner 20 may already be at this optimal distance position. When the user has the mark 38 positioned within the ROI 66 (see FIG. 7), and the distal end 76 of the range finder 26 touches the object 34, at process block 132, the use releases the trigger 40 to enable the scan. Optionally, at process block 134, the processor 44 can then decode the scan. Optionally, as indicated at process block 136, the handheld scanner 20 can provide an indication of a successful image scan and/or decode by enabling one or more feedback devices 46, 50, and/or by displaying the decoded image on the display screen 60 for the user to see. The process can then be repeated for the next mark to be scanned.

Referring to FIG. 9, a method 150 of training a handheld scanner 20 for OCR of a mark 38 is shown. A first step can be to provide a handheld scanner 20 including memory 52 and a user interface 24, as indicated at process block 152. At process block 154, a visual display 60 on the user interface 24 can be enabled. The visual display 60 can be for viewing a live image of the mark 38. At process block 156, the user can then observe the visual display 60 while moving or positioning the handheld scanner 20 so the visual display 60 displays the live image of the mark 38. At process block 160, a scan of the mark 38 can be enabled to generate an electronic image of the mark. The electronic image of the mark 38 can then be stored in the memory 52, as indicated at process block 162. Next, at process block 164, the electronic image of the mark 38 can be associated with the desired electronic data. A font description file 58 can then be generated that associates the electronic image with the desired electronic data, as indicated at process block 166, and at process block 168, the font description file 58 can be stored in the memory 52.

Although the present technology has been described with reference to preferred embodiments, workers skilled in the art will recognize that changes may be made in form and detail without departing from the spirit and scope of the technology. For example, the present technology is not limited to the embodiments of smart cameras and associated devices shown herein and may be practiced with other linescan cameras.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. An OCR trainable handheld scanner comprising:
a scanner subassembly, the scanner subassembly including a vision sensor, a processor coupled to the vision sensor, and memory coupled to the processor;
a user interface coupled to the scanner subassembly, the user interface including a visual display for viewing a live image of at least a portion of a mark to be scanned, the visual display including a region of interest viewable on the visual display, the region of interest to enable a user to position the handheld scanner for optimal X-Y position of the handheld scanner;
a range finder coupled to the scanner subassembly, the range finder extending from a face of the scanner subassembly a predetermined distance, the predetermined distance to provide an optimal working distance for a scan, the range finder extending off of the face of the scanner subassembly substantially parallel to an optical axis of the vision sensor, the range finder comprising a diffusive material; and
vision software executable by the processor, the vision software operable to associate an electronic image of the mark with desired electronic data and to generate a font description file, the font description file usable to decode a subsequent image of the mark.

2. The OCR trainable handheld scanner according to claim 1:
wherein the user interface comprises a portable data terminal.

3. The OCR trainable handheld scanner according to claim 1:
further including at least one of a visual feedback device and an audio feedback device to provide feedback to a user indicating the mark is within the region of interest.

4. The OCR trainable handheld scanner according to claim 1:
further including a light source on the scanner subassembly to provide illumination, the range finder comprising a diffusive material, and the illumination passing through the range finder diffusive material to provide diffuse illumination on the mark.

5. A handheld scanner comprising:
a handheld scanner subassembly, the scanner subassembly including a vision sensor, a processor coupled to the vision sensor, and memory coupled to the processor, the handheld scanner subassembly operable to generate an electronic image of a mark and store the electronic image of the mark in the memory; and
a user interface coupled to the handheld scanner subassembly, the user interface including a visual display for viewing a live image of at least a portion of the mark to be scanned, the visual display including a region of interest viewable on the visual display, the region of interest to enable a user to position the handheld scanner for optimal X-Y position of the handheld scanner for a scan of the mark.

6. The scanner according to claim 5:
further including a range finder coupled to the handheld scanner subassembly, the range finder extending from a face of the handheld scanner subassembly a predetermined distance, the predetermined distance to provide an optimal working distance for a scan.

7. The scanner according to claim 5:
further including a constant focus lens assembly to provide a substantially constant magnification for a predetermined range of working distances.

8. The scanner according to claim 5:
further including a measurement device, the measurement device to determine a distance to the mark, the processor using the distance to the mark for a scale determination.

9. The scanner according to claim 5:
further including a computer coupled to the handheld scanner subassembly, the computer including vision software operable to download the electronic image of the mark, associate the electronic image of the mark with desired electronic data, and to generate a font description file of the associated mark; and
the computer operable to upload the font description file to the handheld scanner subassembly, the font description file usable by the processor to decode a subsequent image of the mark.

10. The scanner according to claim 5:
further including vision software executable by the processor, the vision software operable to associate an electronic image of the mark with desired electronic data and to generate a font description file, the font description file usable to decode a subsequent image of the mark.

11. A handheld scanner comprising:
a handheld scanner subassembly, the scanner subassembly including a vision sensor, a processor coupled to the vision sensor, and memory coupled to the processor, the handheld scanner subassembly operable to generate an electronic image of a mark and store the electronic image of the mark in the memory; and
a range finder coupled to the handheld scanner subassembly, the range finder extending from a face of the scanner subassembly a predetermined distance, the predetermined distance to provide an optimal working distance for a scan, the range finder extending from the face of the scanner subassembly substantially parallel to an optical axis of the vision sensor.

12. The scanner according to claim 11:
wherein the range finder comprises a plurality of fingers extending from a base, the base coupled to the handheld scanner subassembly.

13. The scanner according to claim 11:
further including vision software executable by the processor, the vision software operable to associate an electronic image of the mark with desired electronic data and to generate a font description file, the font description file usable to decode a subsequent image of the mark.

14. The scanner according to claim 11:
further including a user interface coupled to the handheld scanner subassembly, the user interface including a visual display for viewing a live image of at least a portion of the mark to be scanned, the visual display including a region of interest viewable on the visual display, the region of interest to enable a user to position the handheld scanner for optimal X-Y position of the handheld scanner for a scan of the mark.

15. A method for scanning a mark on an object, the method comprising:
providing a handheld scanner, the handheld scanner including a user interface and a range finder;
enabling a visual display on the user interface, the visual display for viewing a live image of at least a portion of the mark;
observing the visual display while moving the handheld scanner so the visual display displays the live image of the at least a portion of the mark;
positioning the live image of the at least a portion of the mark near to or within a region of interest viewable on the visual display for alignment feedback;
positioning the handheld scanner so a distal end of the range finder touches or is substantially near the object; and
enabling a scan of the mark.

16. The method according to claim 15:
further including enabling a trigger on the handheld scanner for enabling the visual display.

17. The method according to claim 15:
further including releasing a trigger on the handheld scanner for enabling the scan of the mark.

18. The method according to claim 15:
further including decoding the scan; and
displaying the decoded mark on the display screen.

19. The method according to claim 15:
further including generating an electronic image of the mark;
storing the electronic image of the mark in a memory in the handheld scanner;
associating the electronic image of the mark with desired electronic data;
generating a font description file that associates the electronic image with the desired electronic data; and
storing the font description file in the memory.

20. The method according to claim 19:
wherein associating further includes using the user interface for associating the electronic image of the mark with the desired electronic data.

21. The method according to claim 19:
further including positioning the live image of the mark near to or within a region of interest viewable on the visual display;
positioning the handheld scanner so a distal end of the range finder touches or is substantially near the object;
enabling a second scan of the mark to generate a second electronic image of the mark;
accessing the font description file stored in the memory; and
decoding the second electronic image of the mark using the accessed font description file.

* * * * *